L. KAMP.
Corn Sheller.
No. 111,350. Patented Jan. 31, 1871.
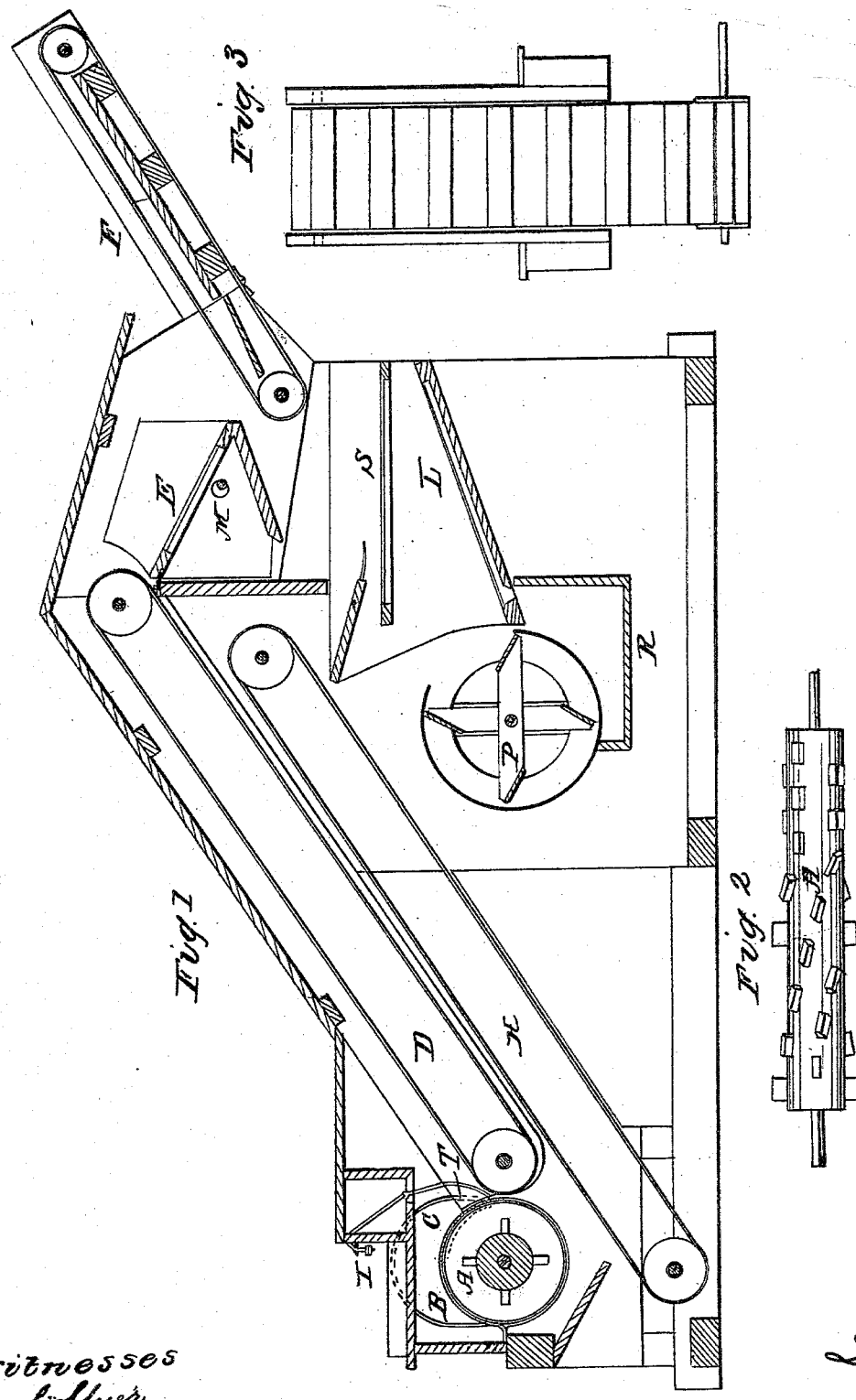

United States Patent Office.

LOUIS KAMP, OF VANDERBURG COUNTY, INDIANA.

Letters Patent No. 111,350, dated January 31, 1871.

IMPROVEMENT IN CORN-SHELLING AND CLEANING-MACHINES.

The Schedule referred to in these Letters Patent and making part of the same.

I, LOUIS KAMP, of the county of Vanderburg, in the State of Indiana, have invented certain Improvements in Corn-Shellers, of which the following is a specification.

Figure 1 is a side elevation of a machine, embodying my invention, and showing the arrangement of the various parts before the machine is inclosed.

Figure 2 is a longitudinal view of the cylinder A, showing the position of the teeth on the same.

Figure 3 gives a front view of the cob-carriers D and F, which are similarly constructed.

A is the cylinder, made of iron. It has four rows of steel teeth, which wind one-fourth around the cylinder in the first one-third of the length of the cylinder, one-eighth around in the second one-third of the length, and parallel with the cylinder along the remaining one-third of its length.

B is the concave, inclosing the cylinder. It is made of wrought-iron bars, placed sufficiently far apart to allow the shelled corn to escape between the bars.

This is a great improvement on the old solid cast-iron concave heretofore in use, as it seldom breaks, and it permits the corn to escape between the bars and get out of the way as soon as it is shelled. These bars are bound together with stout bands of iron.

The shelled corn, falling out through the openings of the concave upon the grain-belt H, is by it carried up and poured down through the grain-riddle S upon the screen L, by which it is conveyed down in front of the fan P into the corn-chute R, from which it is discharged into sacks or boxes.

C, the shutter, which closes the cob-discharge hole T, is regulated by the weight I, and is pressed open by the cobs when they are entirely freed from the corn.

The cobs are pressed out of the concave at the cob-hole T, and conveyed on the cob-carrier D to the cob-riddle E, where the loose grains of corn are let down through the grain-riddle S upon the screen L; thence in front of the fan P into the corn-chute, while the cobs are passed over the riddle onto the second cob-carrier F, by which they are thrown out upon the ground.

The grain-belt and the cob-carriers are each made of leather, covered with cloth, upon which is fastened strips of wood about six inches apart, and of sufficient size to hold the grain or cobs upon the carrier.

M is the eccentric wheel, which shakes the cob-riddle E.

P is the fan, which cleans the corn.

R is the corn-chute, placed in one side of the machine, near the center of the lower part. It is from this chute that the corn finally issues clean from the sheller.

This machine is placed upon a wagon, by which it is conveyed from place to place. It is not necessary to remove it from the wagon during the process of shelling; but it is better on the wagon, as that elevates the corn-chute above the box or other receptacle for the grain.

This machine may be run by either steam or horse-power.

I claim as my invention—

1. The combination, in a machine for shelling corn, of the hinged cover C, adjusted by weights in the manner shown, with the cob-discharge opening O of the concave B, as and for the purpose described.

2. The improved corn-shelling and cleaning machine, herein described, consisting of the cylinder A, provided with shelling-teeth, as shown, concave B, cob-discharge opening O, cover C, provided with weight I, endless belts D H F, riddles E and S, screen L, and pan P, all combined and arranged to operate substantially as described and set forth.

LOUIS KAMP.

Witnesses:
   J. R. TILMAN,
   SINAI HARRINGTON.